(No Model.)
J. STARR.
APPARATUS FOR SILVERING GLASS.
No. 277,803.  Patented May 15, 1883.
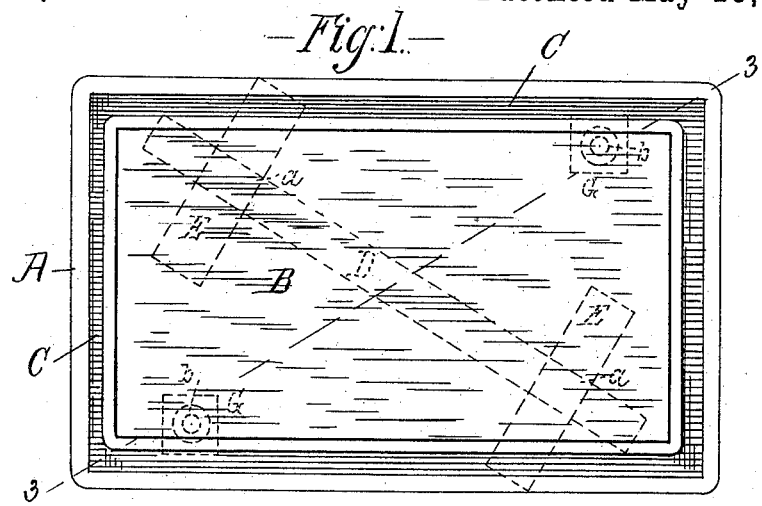
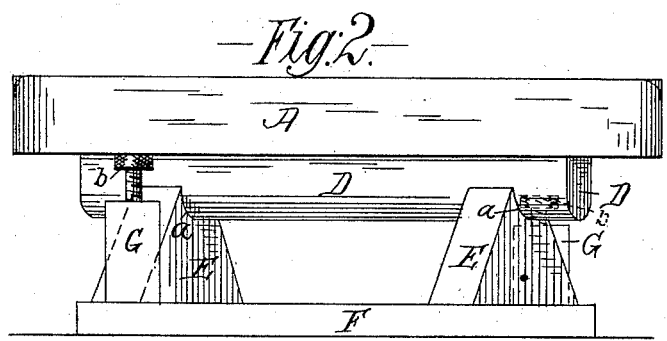
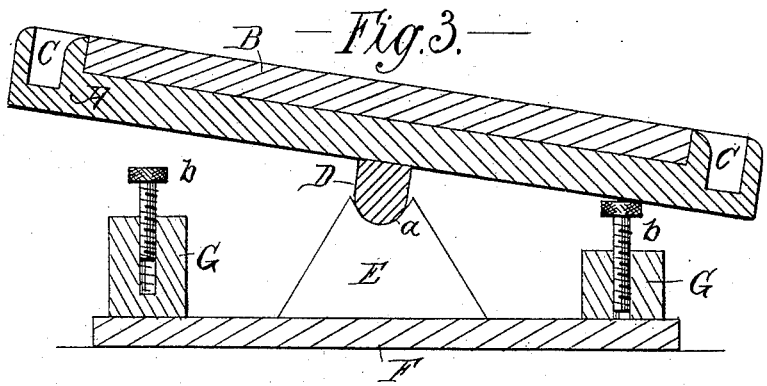
Witnesses:
Wm. S. Bellows.
T. B. Mitchell.
John Starr,
Inventor
per Brown Bros.
Attorneys.

UNITED STATES PATENT OFFICE.

JOHN STARR, OF MALDEN, MASSACHUSETTS.

APPARATUS FOR SILVERING GLASS.

SPECIFICATION forming part of Letters Patent No. 277,803, dated May 15, 1883.

Application filed December 28, 1882. (No model.)

*To all whom it may concern:*

Be it known that I, JOHN STARR, of Malden, in the county of Middlesex and State of Massachusetts, have invented certain new and useful Improvements in Apparatus for Silvering Glass, of which the following is a full, clear, and exact description.

The apparatus heretofore used for silvering glass has been composed of a table made either of stone, marble, or slate, or other similar material in its natural state, and arranged to be tipped or inclined sidewise. In using this apparatus tin-foil is first laid upon the table, and having been stretched and smoothed into close contact with the surface of the table the tin-foil is then rubbed over with quicksilver with a flannel pad and made bright and its scum removed, after which narrow strips of glass are placed around and lapped over the edges of the tin-foil at two ends and one side of the table, (the table being level,) and the tin-foil then covered with quicksilver, which has been strained, to a sufficient depth—say one-sixteenth of an inch—to float the glass which it is intended to silver, and the exposed edge or side of the table cleaned of the quicksilver to the tin-foil by using a hare's foot, which is of the nature of a brush. Then a sheet of paper is laid, extending over the edge, onto the quicksilver about half an inch, over which is placed a strip of glass. The glass to be silvered is then passed over the paper and floated on the quicksilver, when weights are put on it for the proper pressure, the table then tipped sidewise, and in this position it is allowed to remain a sufficient time, when the weights are removed and the silvered glass turned over and drained sufficiently, when it is stood up edgewise to dry.

This invention consists in making the operating-surface of the table of glass or porcelain, or other material of similar character, and also in the arrangement of the table to be supported horizontally and to be tipped or inclined in an angular direction, running diagonally of its length, so as to place it in position, in the operation of silvering a glass, for draining the table at one corner thereof in lieu of at the side, as heretofore.

In the accompanying plate of drawings, Figure 1 is a plan view; Fig. 2, a side view; Fig. 3, a vertical section on line 3 3, Fig. 1, but showing the table as tipped diagonally.

In the drawings, A represents a platen, made of wood or other suitable material, and provided with a glass or porcelain plate, B, making the central portion thereof and the working or operating surface of the table in the silvering of a glass.

C is a gutter or channel surrounding the operating-plate B.

The platen A, carrying the operating-plate B, has a rocking shaft, D, which is secured to its under side, running diagonally of the table, and is arranged to rock or turn in fixed bearings $a$ of blocks E, on a base-plate, F, or the floor, as may be, thus securing the tipping of the table, so as to place a corner of the same into position for the draining of the table in the process of silvering.

G G are two supports, one at each corner diagonally, for the table, to maintain it, with the beveling-screws $b$, properly adjusted in a horizontal position; and, again, by suitable adjustment of said screws, it will allow the table to be tipped or inclined diagonally, as desired.

The table herein described is used substantially as tables heretofore constructed and arranged for the silvering of glass. An operating-surface made of glass or porcelain, or other material of like character, enables the surface of the glass to be silvered to come into closer contact with the quicksilver; it is not liable to be scratched by it, and thereby be injured for use; it is smoother, and, as it is non-porous, requires no grinding from time to time. The arrangement of the table for draining it at one corner in lieu of at the side, as heretofore, secures great economy in the time necessary therefor, and also better results, and cleaner, drier, and smoother edges. Other means of adjusting the table to its horizontal or inclined position may be used in lieu of the screws; but the screws are preferable.

Having thus described my invention, what I claim, and desire to secure by Letters Patent, is—

1. In an apparatus for silvering glass, a table having its operating-surface made of glass or porcelain, or other similar material, substantially as described, for the purpose specified.

2. In an apparatus for silvering glass, an operating-table arranged to be tipped diagonally, substantially as and for the purpose described.

3. In an apparatus for silvering glass, a table having a suitable operating-surface, in combination with one or more screws, $b$, substantially as and for the purpose described.

In testimony whereof I have hereunto set my hand in the presence of two subscribing witnesses.

JOHN STARR.

Witnesses:
 EDWIN W. BROWN,
 WM. S. BELLOWS.